T. A. B. PUTNAM.
Railroad Car Telegraphs.
No. 231,498.                     Patented Aug. 24, 1880.
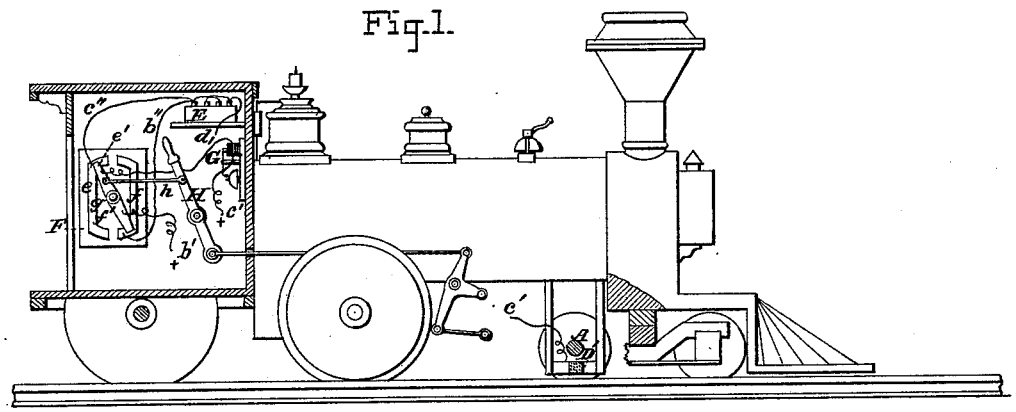
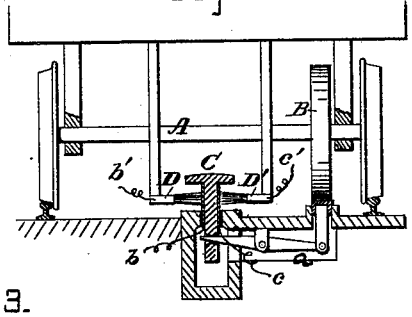
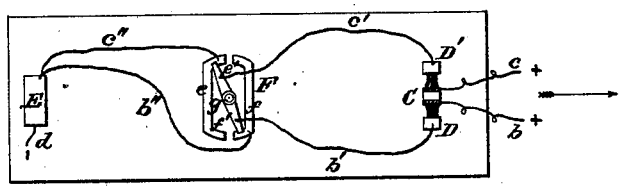
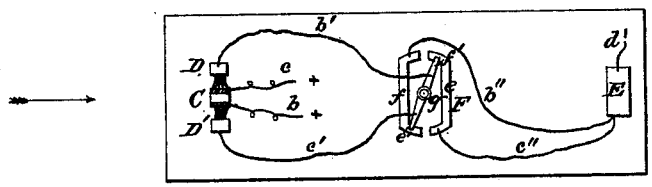
ATTEST:
Thomas F. McDonald.
H. Newell.
INVENTOR:
Theodore A. B. Putnam,
By Burke Fraser Connett
his attorneys.

UNITED STATES PATENT OFFICE.

THEODORE A. B. PUTNAM, OF NEW YORK, N. Y.

RAILROAD-CAR TELEGRAPH.

SPECIFICATION forming part of Letters Patent No. 231,498, dated August 24, 1880.

Application filed June 14, 1879.

*To all whom it may concern:*

Be it known that I, THEODORE A. B. PUTNAM, of the city, county, and State of New York, have invented certain Improvements in Electric Railway Signals and Alarms, of which the following is a specification.

My invention relates to that class of electric railway-signals in which the locomotive or train in passing a given point actuates a conductor placed in or on the road or road-bed, and thus completes electric circuits by which the train may signal its approach to a station or crossing, may lock switches or draws, or may receive a signal of danger from a point ahead. Such a system of signals, in which the locomotive forms a part of the circuit or circuits, is shown and described in my Patent No. 182,384. In such a system at least two circuits are required, generally operated from one battery placed on the locomotive, one of the circuits being employed to enable the locomotive to lock switches, &c., ahead of it, and the other to enable the engineer to receive a signal from any point ahead. In this latter circuit a signal or bell alarm is placed, generally in the cab of the locomotive. Such a system of circuits, if arranged to operate properly when the locomotive is traveling head on in a given direction, will be thrown into confusion if the locomotive be running in the same direction with the tender in front, as will be apparent after a consideration of the arrangement of the mechanism and circuits, as will be hereinafter set forth.

To remedy this difficulty is the object of my present invention, which will be more fully understood by reference to the accompanying drawings, wherein—

Figure 1 represents a locomotive provided with my improvements. Fig. 2 is a transverse section of the road-bed, arranged to illustrate the closing of the circuits by the passing locomotive. Figs. 3 and 4 are merely diagrams intended to more fully illustrate the operation of my improvements.

Let A represent the axle of a locomotive, or it may be the tender, provided with an extra wheel, B, to actuate a depressor-lever, $a$, and thus protrude a road-bed conductor, C. This latter is really a carrier bearing two insulated conducting-plates, from which wires $b\ c$ extend along the road to form electric circuits for actuating mechanisms and sounding alarms, the former being a part of what may be called the "mechanical" circuit, and the latter the "alarm" circuit.

The locomotive bears two conductors, D D', from which wires $b'\ c'$ extend to the positive poles of a battery, E, on the locomotive. From the negative pole of this battery a wire, $d$, extends to some metallic part of the locomotive, which serves, by contact with the rails, as a suitable ground-wire. At the other extremities of the road-wires $b\ c$ wires are also led to the ground, whereby two complete circuits are formed whenever the conductors D D' contact with the metallic plates on the road-bed conductor C.

So far as described, these circuits and the arrangement for closing them are shown substantially in my patent before mentioned. In this arrangement, when the locomotive is traveling head on, the wire $b'$ from the battery, (see Fig. 2,) the conductor D, and the road-wire $b$ would be in one circuit, while the wire $c'$, conductor D', and wire $c$ would be in another circuit, and each circuit would perform intelligent work; but if the locomotive were reversed (turned end for end) and moved in the same direction, the wire $c'$, conductor D', and road-wire $b$ would be placed in the same circuit, as their conductors would contact with opposite sides of the conductor C from that shown in Fig. 2.

Fig. 3 represents a locomotive traveling head on in the direction of the arrow, and Fig. 4 a locomotive traveling in the same direction, but with the engines reversed. Now, if proper provision were not made for this change of position in the conductors D D' confusion in the signals would be inevitable, and this provision is what constitutes my present invention, which I will now describe.

I place in the cab of the locomotive a commutator, F, which may consist of two insulated conducting strips or plates, $e\ f$, and a centrally-pivoted lever or arm, $g$, the extremities of which bear conductors $e'\ f'$, which are insulated from each other. Any good form of commutator or switch capable of interchanging or shunting circuits may be employed. A wire, $b''$, leads from the positive pole of the battery to the conductor $f$, and another wire, $c''$, from the same pole to the conductor $e$.

The wire b' leads from the conductor D to the conductor f', and the wire c' to the conductor e'. An alarm or signal, G, is placed in this circuit. The commutator so arranged is connected with the reversing-lever H of the locomotive by means of a link, h, which extends to the arm g, as shown in Fig. 1. Thus, whenever the engines of the locomotive are reversed the circuits are interchanged automatically, and adapted to perform their parts under the changed conditions without the possibility of mistake or confusion.

Except as a matter of convenience, it is not important whether the wires from the battery connect with the conductors e f or with the conductors e' f', provided the wires from the conductors D D' are properly arranged with reference thereto.

I am aware that many forms of commutators are employed for shunting or interchanging electric circuits, and I do not confine myself to any particular form; but that shown will serve the purpose very well, it being only necessary to shift the arm g so as to bring the conductors e' f' into proper electrical contact with the conductors e f, as shown in Figs. 3 and 4. This shifting of the commutator-arm might be done by hand, independently of the reversing-lever H; but to insure against omission from forgetfulness, I prefer to connect it with and operate it through the said lever.

Any desired number of circuits may be thus interchanged by a suitable commutator, and in some cases circuits may be arranged to be broken or rendered inoperative by the same means—as, for instance, if the road-conductor C be set to one side of the track two sets of conductors, D D', may be arranged on opposite sides of the locomotive. When traveling in one direction one set would engage the road-conductor and the other set would be temporarily inoperative. When traveling in the other direction the other set would be inoperative.

Although the interchange of circuits is incidental to the reversing of the locomotive-engines at all times, it will be understood that when the locomotive is backed without being turned around, as it may be for some temporary purpose, the interchange of the circuits will not effect any useful result, as the intention is to signal only in one direction or ahead through one set of circuits, road-conductors, &c. For trains running in the other direction another distinct set of conductors, circuits, &c., is employed. I have herein shown, however, only the necessary circuits, conductors, &c., for signaling and operating in one direction.

Having thus described my invention, I wish it understood that I am not compelled to employ any particular form of road-bed conductor or any particular kind of conductors on the locomotive to contact therewith; nor is it necessary to the proper working of my invention that such conductors be on the locomotive. They may be attached to the tender as well, and the commutator be arranged in any position where it will be most convenient. I prefer, however, to arrange the parts substantially as shown.

What I claim as new is—

1. As an improvement in electric railway-signals wherein two or more circuits are closed by the contact of conductors on the passing train with conductors on the road, the arrangement on the locomotive of a commutator in said circuits, whereby they may be interchanged or be thrown into or out of circuit when the engines of the locomotive are reversed, substantially as and for the purposes set forth.

2. The combination, with two or more electric circuits arranged to sound alarms and operate mechanisms, and to be closed by the contact of conductors on the passing train with conductors on the road, of the commutator on the locomotive, arranged in said circuits and adapted to interchange them, and the reversing-lever H, arranged to shift said commutator simultaneously with the reversing of the engines, substantially as and for the purposes set forth.

3. The combination of the road-conductors C and their conducting-wires b c, the conductors D D', borne by the train and arranged to contact with the said road-conductors in passing and close the circuits, the conducting-wires b' c', leading from the conductors D D' to the commutator F, the said commutator, and the wires b'' c'', leading from said commutator to the battery, all arranged to operate substantially as set forth.

4. The combination of the road-conductors and their conducting-wires and the conductors borne by the train and their conducting-wires leading to the battery, whereby two or more independent electric circuits are formed, with a commutator, F, arranged in said circuits, and adapted to be shifted by the reversing-lever of the locomotive in the operation of reversing the engines, as shown.

THEODORE A. B. PUTNAM.

Witnesses:
E. S. BLACKWELL,
THOS. C. MILES.